United States Patent [19]

Knickerbocker et al.

[11] Patent Number: 4,473,097
[45] Date of Patent: Sep. 25, 1984

[54] METERING FLUID SPRINKLING CONTAINER

[75] Inventors: Michael G. Knickerbocker, McHenry; Peter R. Rickerson, Barrington, both of Ill.

[73] Assignee: Seaguist Valve Company, Cary, Ill.

[21] Appl. No.: 347,888

[22] Filed: Feb. 11, 1982

[51] Int. Cl.³ .............................................. B65B 3/04
[52] U.S. Cl. .................................. 141/113; 222/107; 222/158; 222/215
[58] Field of Search ............... 222/107, 158, 206, 215, 222/387; 141/3, 20, 113, 346–362, 285–310, 369–386

[56] References Cited

U.S. PATENT DOCUMENTS

| | | | |
|---|---|---|---|
| 2,717,727 | 9/1955 | Robb | 222/215 |
| 2,898,007 | 8/1959 | Gassaway | 222/387 |
| 3,090,070 | 5/1963 | Simons | 222/215 |
| 3,202,324 | 8/1965 | Honnet et al. | 222/206 |
| 3,297,207 | 1/1967 | Ballin | 222/158 |
| 3,325,031 | 6/1967 | Singier | 222/215 |
| 3,718,165 | 2/1973 | Grothoff | 141/20 |
| 4,294,293 | 10/1981 | Lorenz et al. | 141/113 |

Primary Examiner—Houston S. Bell, Jr.
Attorney, Agent, or Firm—Frijouf, Rust & Pyle

[57] ABSTRACT

An apparatus is disclosed for receiving and measuring a quantity of fluid from a filling device comprising a container having a substantially flat container bottom for resting on a horizontal surface. The container has a translucent sidewall with markings disposed on the sidewall enabling an operator to determine the quantity of fluid therein by viewing the fluid level in the container relative to the markings. A sealing valve is disposed proximate the container bottom and adapted to receive fluid from the filling device enabling the container to be filled to a desired fluid level from the fluid filling device. A dispensing orifice is in fluid communication with the interior of the container for dispensing fluid therefrom. The apparatus is suitable for metering and mixing different proportions of different fluids prior to dispensing from the dispensing orifice.

13 Claims, 29 Drawing Figures

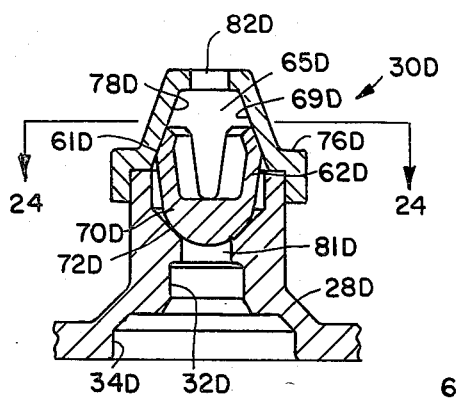
FIG. 23
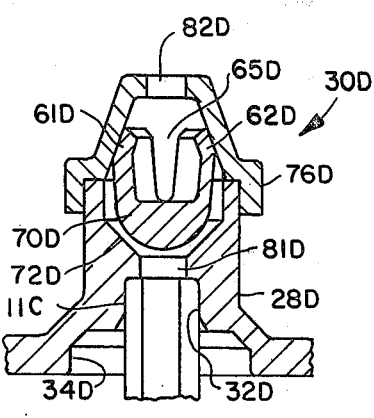
FIG. 24
FIG. 25
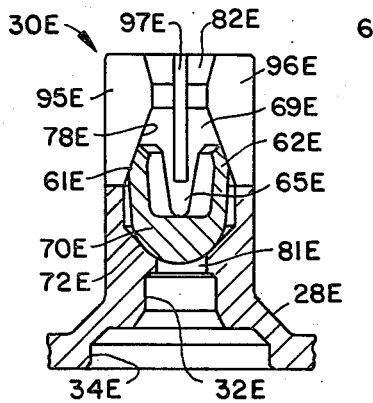
FIG. 26
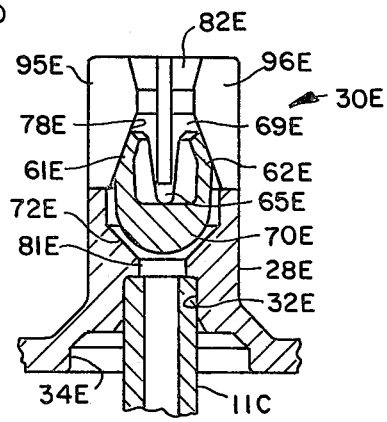
FIG. 27
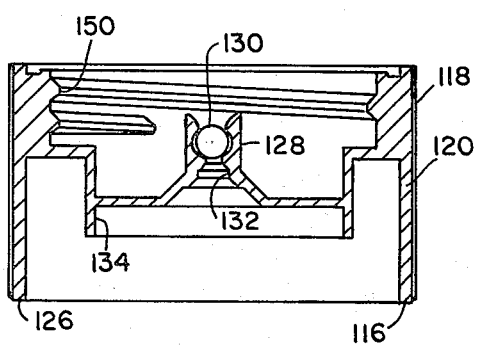
FIG. 29
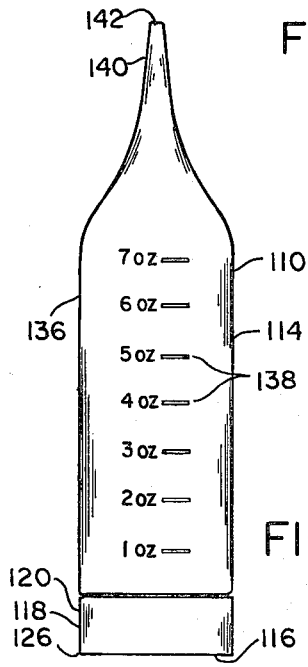
FIG. 28

METERING FLUID SPRINKLING CONTAINER

BACKGROUND OF THE INVENTION

1. Field of the Invention

This invention relates to fluid sprinkling and more particularly to an apparatus for receiving and measuring a quantity of fluid from a filling device.

2. Description of the Prior Art

Various types of apparati have been devised in the prior art for receiving and measuring a quantity of fluid from a filling device. Some apparati incorporate pressure valves for determining the content of fluid under pressure within a container. Others in the prior art have incorporated translucent sidewalls with markings disposed thereon for indicating the quantity of fluid material within the container. The applications of this basic principle are numerous and extend into various diverse arts and fields of speciality.

A particular problem for receiving, measuring and mixing quantities of fluids exists in the beauty industry. A cosmetologist typically is required to measure different quantities of different fluids prior to application to the hair of a customer. The mixing is generally accomplished within a fluid sprinkling container having flexible translucent sidewalls and a nozzle to sprinkle fluid from the nozzle upon collapsing the sidewalls of the container. The container typically contains markings disposed on the side of the container for indicating the quantity of fluid therein. The operator fills the container with a first fluid to a first fluid level and subsequently fills the container with a second fluid to a second fluid level through a open mouth in the top of the container. A dispensing orifice and cap is inserted on the open mouth of the container for dispensing the mixed fluids from the interior of the container.

It should be appreciated by those skilled in the art that the prior art dispensing container has no provision for enabling filling from an aerosol device. Some in the prior art have attempted to utilize or develop a container which is suitable for filling with an aerosol device. U.S. Pat. No. 3,559,701 discloses a refillable sprayer apparatus employing a filling valve and an air release valve which are directly or indirectly mechanically linked to provide sufficient filling of the sprayer while at the same time preventing overfilling and the resultant loss of excess liquid. This device overcame some of the problems of the prior art devices but unfortunately was overly complex and was not widely accepted in the marketplace.

Therefore it is an object of this invention to provide an apparatus which overcomes the aforementioned inadequacies of the prior art devices and provides an improvement which is a significant contribution to the advancement of the fluid sprinkling art.

Another object of this invention is to provide an apparatus for receiving and measuring a quantity of fluid from a fluid filling device comprising a container having a substantially flat container bottom for resting on a horizontal surface with a sealing valve disposed proximate the container bottom and adapted to receive fluid from the filling device enabling the container to be filled to a desired fluid level from the fluid filling device.

Another object of this invention is to provide an apparatus for receiving and measuring a quantity of fluid from a fluid filling device utilizing a substantially rigid base with the sealing valve disposed therein with substantially translucent and flexible sidewalls enabling sprinkling of fluid from a dispensing orifice in the container.

Another object of this invention is to provide an apparatus for receiving and measuring a quantity of fluid from a fluid filling device wherein the sealing valve enables fluid flow into the container and prevents fluid flow out of the container.

Another object of this invention is to provide an apparatus for receiving and measuring a quantity of fluid from a fluid filling device wherein the sealing valve is contained in a container boss extending from the container bottom to be internal the container with an annular recess disposed in the container base in fluid communication with the sealing valve for providing sealing engagement with a discharge port of the fluid filling device.

Another object of this invention is to provide an apparatus for receiving and measuring a quantity of fluid from a fluid filling device incorporating novel sealing valve means of various designs.

Another object of this invention is to provide an apparatus for receiving and measuring a quantity of fluid from a fluid filling device which is inexpensive and is compatible for use with conventional aerosol devices enabling the apparatus to be widely accepted in the marketplace.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention may be incorporated into an apparatus for receiving and measuring a quantity of fluid from a filling device comprising container means having a substantially flat container bottom for resting on a horizontal surface. The container means has translucent sidewall means with marking means disposed on the sidewall means of the container means enabling an operator to determine the quantity of fluid therein by viewing the fluid level in the container means relative to the marking means. A sealing valve is disposed proximate the container bottom and adapted to receive fluid from the filling device enabling the container to be filled to a desired fluid level from the fluid filling device. A dispensing orifice is in fluid communication with the interior of the container for dispensing fluid from the container.

In a more specific embodiment of the invention, the container means includes a container having an opening disposed in the top of the container and a container cover for sealing engagement with the opening of the container with the container cover having the dispensing orifice disposed therein. The sidewall means of the container is preferably flexible enabling the operator to depress the container to discharge fluid from the dispensing orifice. The sealing valve means enables fluid flow into the container means and prevents fluid flow out of the container means. In one embodiment of the invention, the container means includes a substantially rigid container base for receiving the sealing valve therein and for defining the substantially flat container bottom. The container means also comprises flexible sidewall means secured to the container base enabling the operator of the apparatus to depress the flexible sidewalls to discharge fluid from the dispensing orifice. Preferably the sealing valve is disposed in a container boss extending from an annular recess disposed in the container base in fluid communication with the sealing valve means for providing sealing engagement with a discharge port of the fluid filling device.

The sealing valve means may take various forms, each of which are designed to be easily fabricated and reliable in operation. More specifically, the sealing valve includes a valve chamber having an input and an output communicating with the exterior and interior of the container respectively. The valve chamber has a sealing surface disposed between the input and output of the valve chamber. A movable valve element is disposed in the chamber with resilient means biasing the movable valve element into sealing engagement with the sealing surface and for enabling displacement of the movable valve element in response to fluid pressure from the fluid filling device. In one embodiment, the resilient means comprises at least a portion of the valve chamber being resilient for biasing the movable valve element into sealing engagement with the sealing surface. In another embodiment of the invention, the resilient means comprises at least a portion of the movable valve element being resilient for biasing the movable valve element into sealing engagement with the sealing surface. In still a further embodiment of the invention, the valve may comprise a resilient valve chamber including a sphincter valve for enabling fluid flow only in a direction into the container.

In still another embodiment of the invention, the movable valve element comprises a rigid spherical member disposed within the valve chamber and the resilient means includes the valve chamber having a plurality of resilient legs biasing the spherical member into sealing engagement with the sealing surface. In another embodiment of the invention, the resilient means includes a movable valve element having a plurality of resilient legs for cooperation with the valve chamber for biasing the movable valve element into sealing engagement with the sealing surface.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 23 is an enlarged side sectional view of a fifth embodiment of a valve suitable for use with the invention shown in FIG. 1;

FIG. 24 is a view along line 24—24 in FIG. 23;

FIG. 25 is the valve of FIG. 23 shown in the open position;

FIG. 26 is an enlarged side sectional view of a sixth embodiment of a sealing valve suitable for use with the invention shown in FIG. 1;

FIG. 27 is the valve of FIG. 26 in the open position.

FIG. 28 is an elevational view of a seventh embodiment of the present invention; and FIG. 29 is a side sectional view of the base of the embodiment shown in FIG. 28.

Similar reference numerals refer to similar parts throughout the several views of the drawings.

DETAILED DISCUSSION

Figure 1:
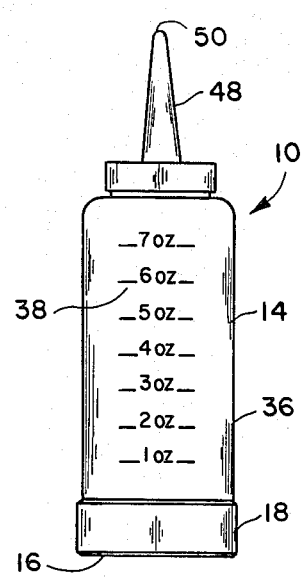
FIG. 1 is a side elevational view of an apparatus in accordance with the present invention.
Figure 2:
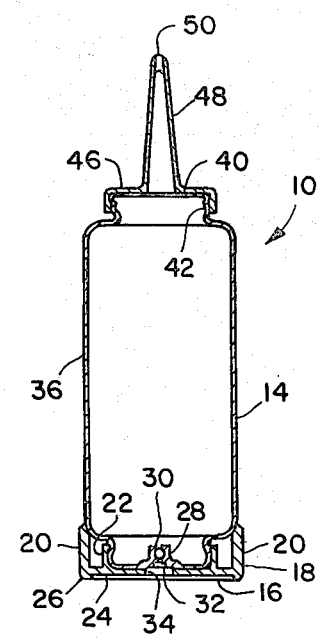
FIG. 2 is a sectional view of FIG. 1.
Figure 9:
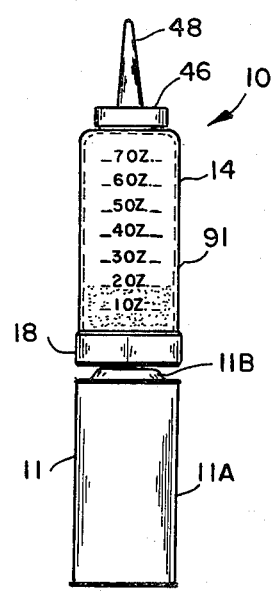
FIG. 9 is a side elevational view illustrating the filling of the container of FIG. 1 with a first fluid.
Figure 10:
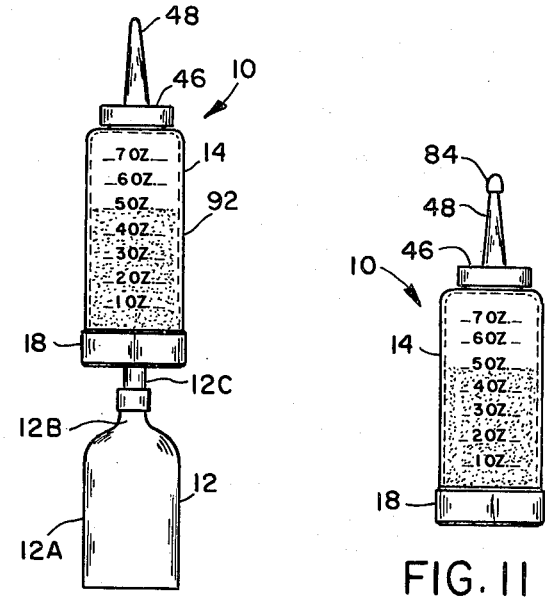
FIG. 10 is a side elevational view illustrating the filling of the container of FIG. 1 with a second fluid.
Figure 11:
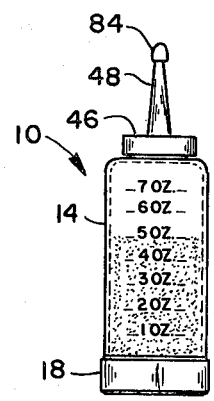
FIG. 11 is a side elevational view illustrating the mixture of the first and second fluids in the container of FIG. 1.
Figure 12:
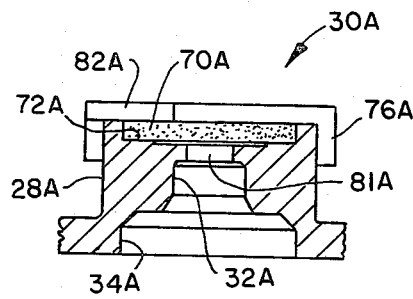
FIG. 12 is an enlarged side sectional view of a second embodiment of a sealing valve suitable for use with the invention shown in FIG. 1.

FIGS. 1 and 2 illustrate an apparatus 10 for receiving and measuring a quantity of fluid from a filling device. A first filling device 11 is shown in FIG. 9 and a second filling device 12 is shown in FIG. 10. The first filling device 11 is shown as an aerosol device comprising an aerosol container 11A having a conventional mounting cup 11B and a conventional valve stem shown in FIG. 7. The second filling device 12 comprises a pump container 12A having a pump 12B and a pump stem 12C. The structure of the aerosol valve assembly and the pump assembly and the operation thereof should be well known to those skilled in the art.

The apparatus 10 comprises container means 14 having a substantially flat container bottom 16 for resting on a substantially horizontal surface. The container means 14 comprises a container base 18 having an outer sidewall 20 and an inner sidewall 22 with a lip 26 providing the substantially flat bottom 16. The container base 18 includes a boss 28 for receiving a sealing valve 30 to be internal the container means 14. The container base 18 also includes recesses 32 and 34 shown more fully in FIGS. 7 and 18 for cooperation with the valve stem 11C and the pump stem 12C.

The container means 14 includes a flexible translucent sidewall 36 having marking means 38 disposed thereon enabling the operator to determine the quantity of fluid in the container means 14 by viewing the fluid level through the translucent sidewall 36 relative to the marking means 38.

Figure 3:
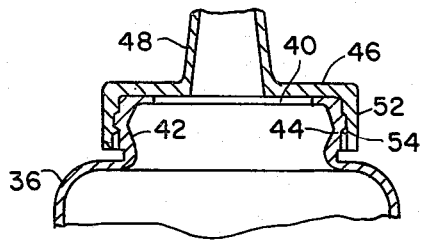
FIG. 3 is an enlarged view of a top portion of FIG. 2.

The upper portion of the container means 14 comprises an opening 40 having a molded mouth 42 as shown more fully in FIG. 3 with threads 44 extending about the outer periphery of the mouth 42. A container cover 46 includes an integral nozzle 48 with a dispensing orifice 50 at the terminal end thereof. The container cover includes a sidewall 52 having threads 54 for locking engagement with the threads 44 of mouth 42 as shown in FIGS. 2 and 3. The engagement between the threads 44 and 54 results in a fluid tight seal between the sidewall 36 and the container cover 46 enabling the operator to squeeze the flexible sidewalls 36 to dispense fluid from the dispensing orifice 50.

Figure 4:
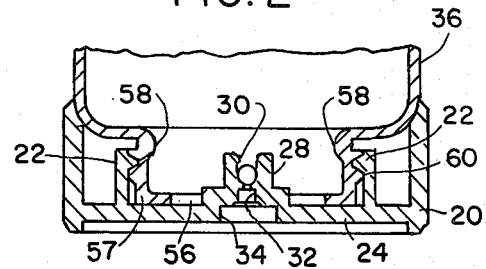
FIG. 4 is an enlarged view of a bottom portion of FIG. 2.

In a similar manner, the bottom of the container means 14 comprises an opening 56 having a molded mouth 57 as shown more fully in FIG. 4, with threads 58 for cooperation with threads 60 extending from the inner sidewall 22. The engagement between the threads 58 and 60 results in a fluid tight seal between the sidewalls 36 and the container base 18. It should be appreciated by those skilled in the art that the molded mouth 44 and the molded mouth 57 may be identical enabling the container to be assembled irrespective of the orientation relative to the container cover or the container base 18. The use of identical top and bottom portions also facilitates fabrication of the apparatus.

Figure 5:
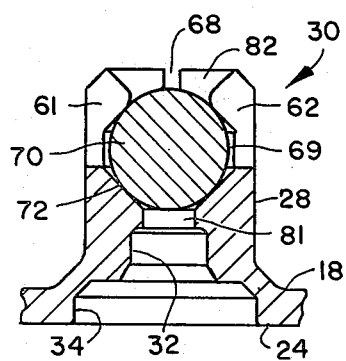
FIG. 5 is an enlarged partial side sectional view of the sealing valve of FIG. 2.
Figure 6:
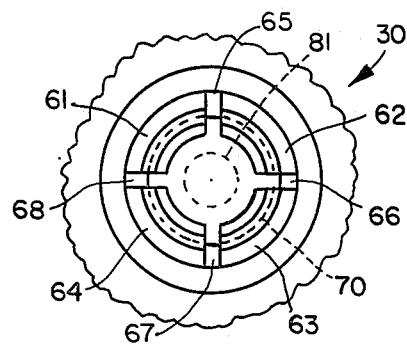
FIG. 6 is a plan view of FIG. 5.

FIGS. 5 and 6 illustrate a side sectional and plan views of a first embodiment of the sealing valve 30 which is shown in the invention of FIGS. 1-4. In this embodiment, the boss 28 includes a plurality of resilient legs 61-64 with spaces 65-68 established therebetween. A valve chamber 69 has a rigid spherical sealing member 70 disposed therein and biased by the resilient legs 61-64 into sealing engagement with an annular sealing surface 72 located between a valve input 81 and a valve output 82.

Figure 7:
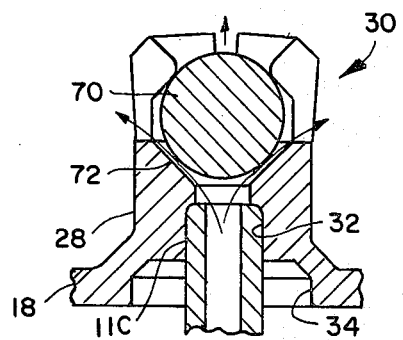
FIG. 7 is the valve of FIG. 5 in the open position.
Figure 8:
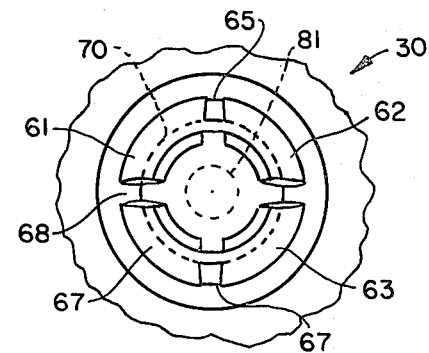
FIG. 8 is a plan view of FIG. 7.

FIGS. 7 and 8 illustrate the insertion of a valve stem 11C into recess 32. Pressure from the propellant of the aerosol device causes deflection of the resilient legs 61-64 to displace the sealing element 70 from the sealing surface 72 thereby enabling product and propellant to be transferred into the container means 14 by the operator while monitoring the fluid level in the container means 14 relative to the marking means 38. The recess 32 is preferably established for sealing engagement with the valve stem 11C to prevent the spillage of product and propellant from the container 14 during the filling process.

FIG. 9 illustrates the filling of the container means 14 by a first filling device 11 whereby the first filling device 11 is placed on a substantially horizontal surface (not shown) and the apparatus 10 is inserted thereon to depress the valve stem 11C to discharge the first fluid into the container 14 to a first fluid level 91.

Figure 18:
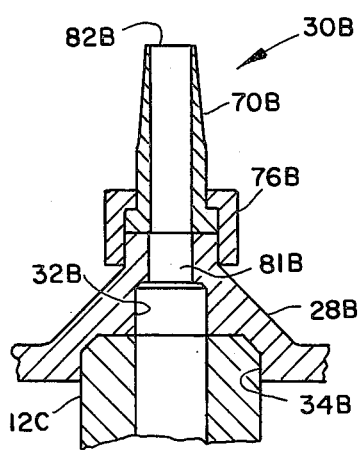
FIG. 18 is the valve of FIG. 18 in the open position.

FIG. 10 illustrates the filling of the container 14 to a second fluid level 92 by a second fluid from the second filling device 12. The pump stem 12C of the pump 12B is received within the recess 34B as shown in FIG. 18 to provide for a fluid tight seal. The second fluid is then pumped into the container 14 by conventional pumping action. The container 14 may be adapted to receive a cap 84 to enable mixing of the first and second fluids by shaking prior to use by the operator.

The instant invention provides a novel and simple method of mixing a measured amount of first and second fluids within a fluid sprinkling container from an aerosol filling device or a pump device. The invention provides a minimum of spillage and the requirement of cleaning only one container since the measuring and dispensing is accomplished within the container means 14. The use of aerosol filling devices and pump devices further adds to the convenience of the present invention.

Now that the first embodiment of the present invention has been set forth, numerous variations of the valving assembly may be provided for various applications and various fluids as should be well known to those skilled in the art. FIGS. 12-15 illustrate a second embodiment of a sealing valve 30A disposed in a boss 28A having recesses 32A and 34A. The sealing valve 30A comprises an input 81A and an output 82A with a resilient diaphragm 70A captured between the boss 28A and a cap 76A having a port defining the valve output 82A. A sealing surface 72A is disposed on the boss 28A. The resilient diaphragm 70A may be a resilient rubber material or the like.

Figure 14:
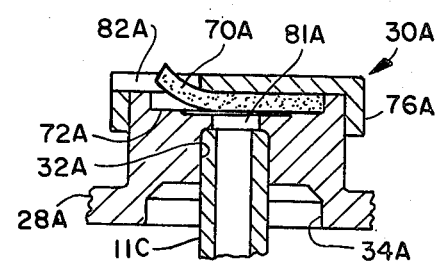
FIG. 14 is the valve of FIG. 12 in the open position.
Figure 13:
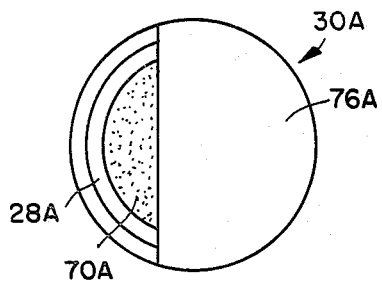
FIG. 13 is a plan view of FIG. 12.
Figure 15:
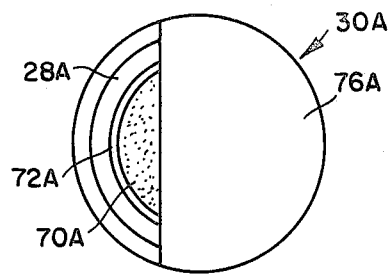
FIG. 15 is a plan view of FIG. 14.

FIGS. 14 and 15 illustrate the application of fluid pressure from valve stem 11C sealingly engaging with recess 32A. Upon application of fluid pressure from the first filling device 11, the resilient sealing element 70A is displaced from the sealing surface 72A enabling fluid flow through the valve 30A to fill the container 14 in accordance with the requirements of the operator.

Figure 16:
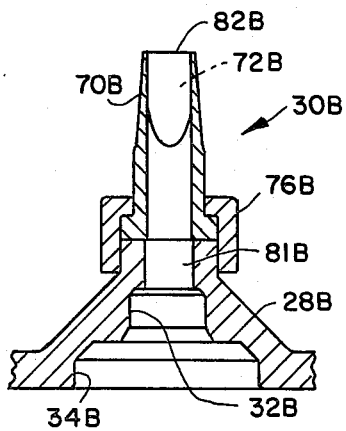
FIG. 16 is an enlarged side sectional view of a third embodiment of a sealing valve suitable for use with the invention shown in FIG. 1.
Figure 17:
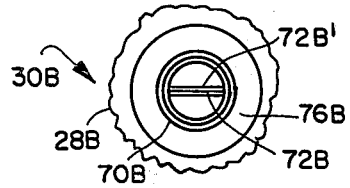
FIG. 17 is a plan view of FIG. 16.

FIGS. 16-19 illustrate a third embodiment of a sealing valve 30B disposed on boss 28B comprising a valve input 81B and a valve output 82B. In this embodiment, the valve element is defined in a flexible rubber valve element 70B having sealing surfaces 72B and 72B'. The valve element 70B is secured to boss 28B by a cap 76B. The valve element 70B is commonly referred to as a sphincter valve enabling fluid flow only from the input 81 to the output 82 upon application of fluid pressure. FIGS. 16 and 17 illustrate the unattended position or closed position of the sealing valve wherein the sealing surfaces 72B and 72B' are collapsed by the internal resiliency to form a fluid tight seal.

Figure 19:
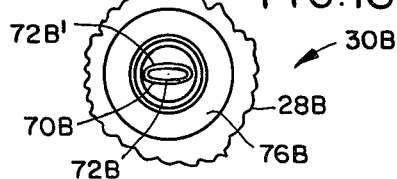
FIG. 19 is a plan view of FIG. 18.

FIGS. 18 and 19 illustrate the open position of the valve whereby fluid pressure from the pump stem 12C deforms the resilient valve element 70B to displace sealing surfaces 72B from the adjacent sealing surface 72B' to provide for fluid input into the container. The cap 76B may be secured to the boss 28B by means well known in the art.

Figure 20:
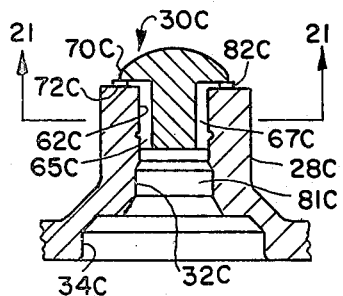
FIG. 20 is an enlarged side sectional view of a fourth embodiment of a sealing valve suitable for use with the invention shown in FIG. 1.
Figure 21:
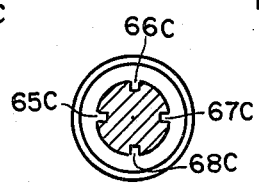
FIG. 21 is a sectional view along lines 21—21 in FIG. 20.
Figure 22:
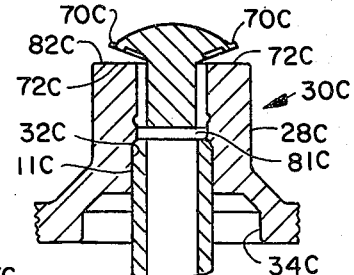
FIG. 22 is the valve of FIG. 20 in the open position.

FIGS. 20-22 illustrate a fourth embodiment of a sealing valve 30C disposed in boss 28C between an input 81C and an output 82C. In this embodiment, the boss 28C includes a bore 62C for receiving a plug which is shown in section in FIG. 21. The plug comprises a plurality of spaces 65C-68C for enabling fluid flow therethrough.

The upper perimeter 70C of the plug engages with a sealing surface 72C as shown in FIG. 20. Upon application of fluid pressure by valve stem 11C, the outer periphery 70C is deformed and displaced from sealing surface 72C to enable fluid flow into the container as heretofore described.

FIGS. 23-25 illustrate a fifth embodiment of the invention showing a sealing valve 30D comprising a boss 28D having an input 81D and an output 82D. In this embodiment, the boss provides a valve chamber 69D having a partially conical sealing surface 72D for a movable valve element 70D. The valve element 70D is shown in plan view in FIG. 24 to comprise three resilient legs 61-63D defining spaces 65D-67D therebetween. The valve element 70D is retained within the valve chamber 69D further defined by a cap 76D having a conical internal surface 78D.

FIG. 25 illustrates the application of fluid pressure whereby the resilient legs 61D-63D are deformed inwardly enabling the valve element 70D to be displaced from the sealing surface 72D to allow fluid to pass from input 81D through output 82D. The resilient legs 61D-63D in combination with the conical surface 78D provide a resilient bias to resiliently urge valve element 70D into sealing engagement with sealing surface 72D.

FIGS. 26 and 27 illustrate a sixth embodiment of the invention showing a sealing valve 30E comprising a boss 28E having an input 81E and an output valve 82E. In this embodiment, the boss provides a valve chamber 69E having a partial conical sealing surface 72E for a movable valve element 70E. The movable valve element 70E is identical to the valve element 70D shown in FIGS. 23 and 24 and comprises resilient legs 61E and 62E with a space 65E therebetween. In this embodiment, the valve element 70E is retained within the valve chamber with the valve chamber being an integral unit having a plurality of valve chamber legs shown as 95E and 96E defining spaces therebetween one shown as space 97E. The resilient legs 95E and 96E and two remaining legs, which are not shown in FIGS. 26 and 27, enable the movable valve element 70 to be inserted within the valve chamber by outwardly deforming the valve chamber legs 95E and 96E providing a two-piece valve system with the boss being a single element and the movable valve chamber being a second element.

FIG. 27 illustrates the application of fluid pressure whereby the resilient legs 61E and 62E in combination with the resilient legs 95E and 96E deform enabling the valve element to be displaced from the sealing surface 72E to allow fluid to pass from input 81E through output 82E. The resilient legs 61E and 62E in combination with a conical surface 78E on the inner portion of the chamber legs 95E and 96E provide a resilient bias to resiliently urge valve element 70E into sealing engagement with the sealing surface 72E. Preferably, the resilient legs 61E and 62E are more easily deformed than the chamber legs 95E and 96E to insure that the valve element 70E remains within the valve chamber 69E.

FIGS. 28 and 29 show a seventh embodiment of the present invention comprising an apparatus 110 including a container means 114 having a substantially flat container bottom 116 for resting on a substantially horizontal surface. The container means 114 comprises a container base 118 having an outer sidewall 120 with a lip 126 providing the substantially flat bottom 116. The container base 118 includes a boss 128 for receiving a sealing valve 130 to be internal the container means 114. The sealing valve 130 is similar to that shown in FIGS. 5 and 6 and operates in a similar manner thereto.

The container base 118 includes a recess 132 for cooperation with the valve stem 11C in addition to including a recess 134 for cooperation with the pump stem 12C as heretofore described.

The container means 114 includes a flexible translucent sidewall 136 having marking means 138 disposed thereon enabling the operator to determine the quantity of fluid in the container means 114 by viewing the fluid level through the translucent sidewall 136 relative to the marking means 138. The upper portion of the container means 114 comprises a nozzle 140 having an opening 142 which is integrally formed with the sidewalls 136 of the container means.

The container base 118 includes means to affix the base 118 to the sidewalls 136 of the container 114. In this embodiment, threads 130 are disposed internal the base 118 for cooperation with threads (not shown) molded into the lower portion of the container 114 in a manner similar to FIGS. 2 and 4. Although threads have been illustrated to affix the container 114 to the base 118, it should be appreciated by those skilled in the art that various other means may be employed to provide a fluid-tight engagement therebetween.

The embodiment shown in FIGS. 28 and 29 has the additional advantage of an integral nozzle 140 with an opening 142 therein further reducing the cost and providing a more aesthetically pleasing container for industries such as the beauty industry and the like.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, what is claimed is:

1. An apparatus for receiving and measuring a quantity of fluid from a filling device, comprising in combination:

container means having a substantially rigid container base defining a substantially flat container bottom for resting on a horizontal surface;

said container means including a container having translucent flexible sidewall means;

means connecting said container to said container base;

marking means disposed on said sidewall means of said container enabling an operator to determine the quantity of fluid therein by viewing the fluid level in said container relative to said marking means;

sealing valve means disposed in said container base for receiving fluid from the filling device enabling said container means to be filled to a desired fluid level from the fluid filling device;

said sealing valve means enabling fluid flow into said container means through and preventing fluid flow out of said container means through said sealing valve means; and a dispensing orifice in fluid communication with the interior of said container means for enabling the operator to dispense fluid from said container means upon depression of said flexible sidewall means.

2. An apparatus as set forth in claim 1, wherein said container means includes a container having an opening disposed in the top of said container;

a container cover for sealing engagement with said opening of said container; and said dispensing orifice being disposed in said container cover.

3. An apparatus as set forth in claim 1, wherein said sealing valve means is disposed in a container boss extending from said container base to be internal said container means; and an annular recess disposed in said container base in fluid communication with said sealing valve means for providing sealing engagement with a discharge port of the fluid filling device.

4. An apparatus as set forth in claim 1, wherein said sealing valve means comprises a resilient valve chamber including a sphincter valve for enabling fluid flow therethrough only in a direction into said container means.

5. An apparatus as set forth in claim 1, wherein said sealing valve means includes a valve chamber having an input and output communicating with the exterior and the interior of container means, respectively;

said valve chamber having a sealing surface disposed between said input and said output of said valve chamber;

a movable valve element disposed in said valve chamber;

resilient means for biasing said movable valve element into sealing engagement with said sealing surface and for enabling displacement of said movable valve element in response to fluid pressure from the fluid filling device.

6. An apparatus as set forth in claim 5, wherein said resilient means comprises at least a portion of said valve chamber being resilient for biasing said movable valve element into sealing engagement with said sealing surface.

7. An apparatus as set forth in claim 5, wherein said resilient means comprises at least a portion of said movable valve element being resilient for biasing said movable valve element into sealing engagement with said sealing surface.

8. An apparatus as set forth in claim 6, wherein said movable valve element comprises a rigid spherical member disposed within said valve chamber; and said resilient means including said valve chamber having a plurality of resilient legs biasing said spherical member into sealing engagement with said sealing surface.

9. An apparatus as set forth in claim 7, wherein said resilient means includes said movable valve element having a plurality of resilient legs for cooperation with said valve chamber for biasing said movable valve element into sealing engagement with said sealing surface.

10. An apparatus as set forth in claim 7, wherein said resilient means comprises said movable valve element being a resilient diaphragm biased into sealing engagement with said sealing surface.

11. An apparatus as set forth in claim 7, wherein said movable valve element includes an annular valve surface resilient biased into sealing engagement with an annular sealing surface disposed about the periphery of said valve chamber.

12. An apparatus for receiving and measuring a quantity of fluid from a filling device, comprising in combination:

container means having a substantially rigid container base defining a substantially flat container bottom for resting on a horizontal surface;

said container means including a container having translucent flexible sidewall means secured to said container base;

thread means interconnecting said container base to said container for forming a fluid-tight seal between said thread means;

sealing valve means disposed in said container base for receiving fluid from the filling device enabling said container means to be filled to a desired fluid level from the fluid filling device;

said sealing valve means enabling fluid flow into said container and preventing fluid flow out of said container through said sealing valve means;

marking means disposed on said sidewall means of said container enabling an operator to determine the quantity of fluid therein by viewing the fluid level in said container relative to said marking means; and a dispensing orifice in fluid communication with the interior of said container means for enabling the operator to dispense fluid from said container means upon depression of said flexible sidewall means.

13. An apparatus for receiving and measuring a quantity of a first and a second fluid from a first and second filling device, one of the filling devices being an aerosol device and the other of the filling devices being a pump device, comprising in combination:

container means having a substantially rigid container base defining a substantially flat container bottom for resting on a horizontal surface;

said container means including a container having translucent flexible sidewall means secured to said container base;

marking means disposed on said sidewall means of said container enabling an operator to determine the quantity of fluid therein by viewing the fluid level in said container means relative to said marking means;

sealing valve means disposed in said container base for enabling fluid flow into said container means and preventing fluid flow out of said container means through said sealing valve means;

a first and a second recess in said container base in fluid communication with said sealing valve means for respectively forming a fluid-tight seal with the first and second filling devices enabling said container means to be filled to a first desired fluid level from the first filling device and to subsequently fill said container means to a second fluid level from the second filling device; and a dispensing orifice in fluid communication with the interior of said container means for enabling the operator to mix and dispense the first and second fluids from said container means upon depression of said flexible sidewall means.

* * * * *